Figure 1:
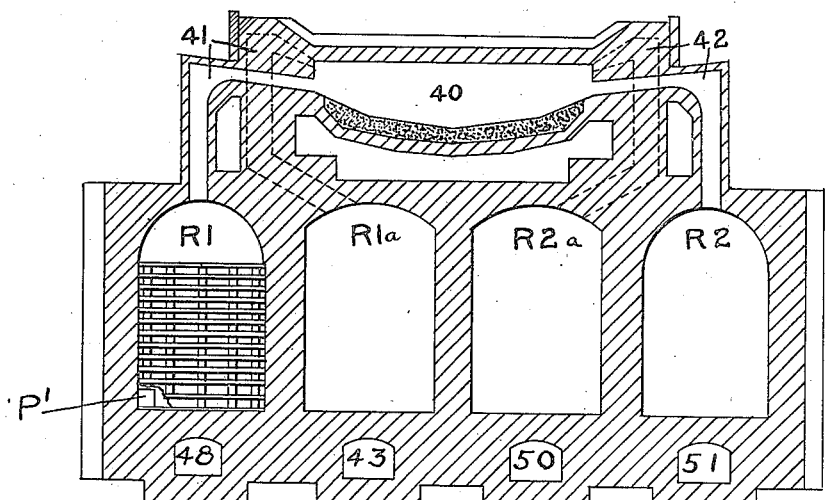

C. H. MACMILLAN.
REGULATING DEVICE FOR REGENERATIVE FURNACES.
APPLICATION FILED APR. 14, 1915.

1,166,069.

Patented Dec. 28, 1915.
2 SHEETS—SHEET 1.

INVENTOR
C. H. Macmillan
BY Karl Fruning
his ATTORNEY

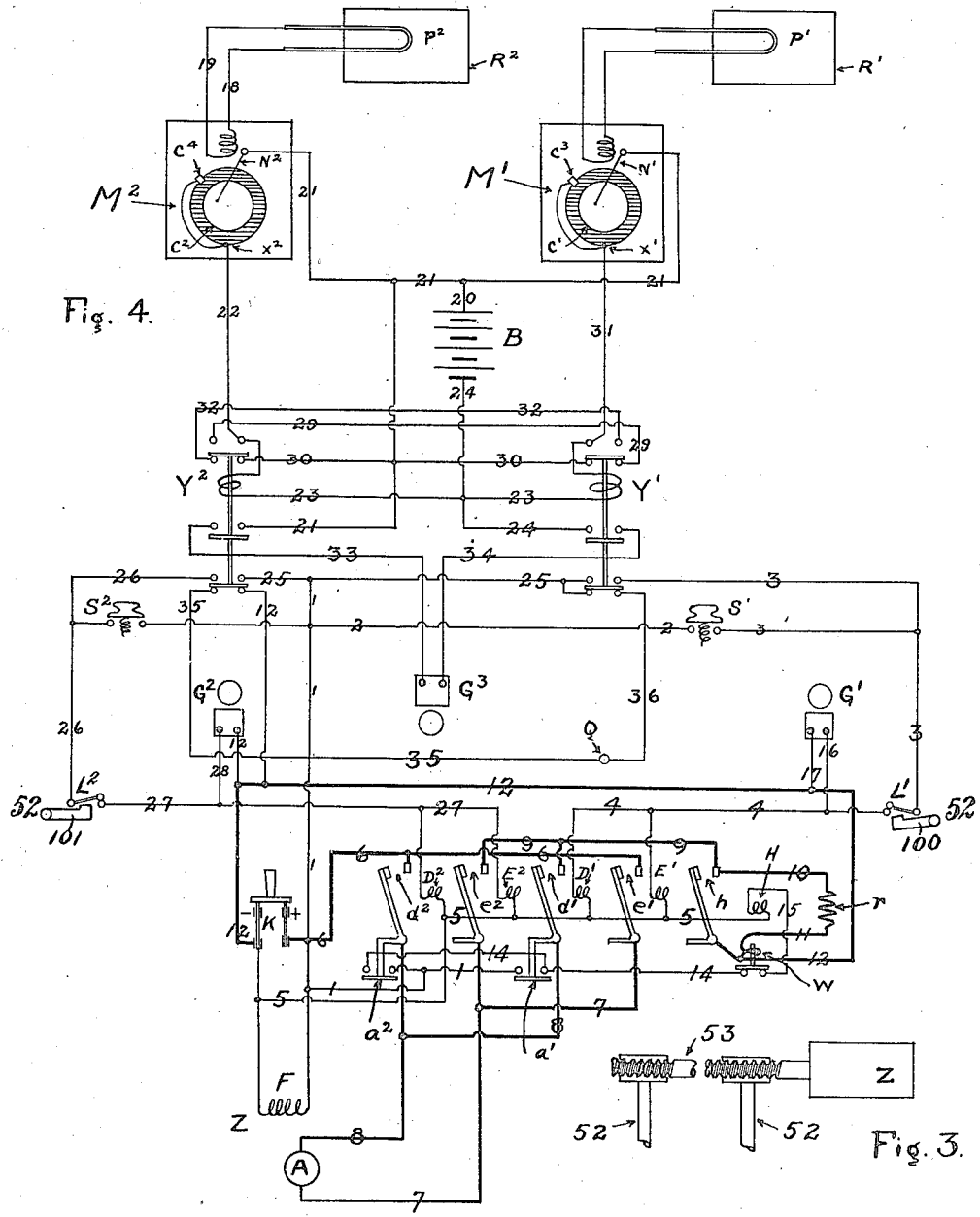

UNITED STATES PATENT OFFICE.

CHARLES H. MACMILLAN, OF LIMERICK, MAINE.

REGULATING DEVICE FOR REGENERATIVE FURNACES.

1,166,069.　　　　　Specification of Letters Patent.　　Patented Dec. 28, 1915.

Application filed April 14, 1915. Serial No. 21,429.

*To all whom it may concern:*

Be it known that I, CHARLES H. MACMILLAN, a citizen of the United States, residing at Limerick, in the State of Maine, have invented certain new and useful Improvements in Regulating Devices for Regenerative Furnaces, of which the following is a specification.

My invention relates to regulating the passage of a fluid through a plurality of devices which are alternately used for its conduction and is particularly intended to direct the fluid through one or another of the devices in accordance with the conditions of the device. To this end a device is installed so as to be responsive to the condition of the conductor device and this is adapted to operate means to direct the fluid through the conductor which is in the proper condition to receive the fluid. While not restricted to such use my invention may advantageously be used in connection with the manufacture of steel and as one application I will explain its use in connection with an open hearth furnace. It will be understood however that the invention is not limited specifically to an open hearth furnace, nor is it limited to heat only, but applies also to apparatus requiring or producing electricity, gases or liquids under pressure, and radiant energy of any form whatever.

It is customary, in the manufacture of open hearth steel, to utilize a furnace comprising an oblong hearth with an arch shaped roof. There are two or more pairs or sets of checker chambers or regenerators, one pair being arranged adjacent each end of the hearth. Means are provided for conducting fuel and air through the sets of regenerators alternately to the hearth. A stack or chimney is provided and arranged to be connected to the hearth alternately through the set of renegerators not conducting fuel and air so as to receive the gaseous products of combustion or exhaust or waste gases from the hearth. In the operation of the furnace it is customary to first heat the furnace by means of a fire until the regenerators or one set of them have reached a dull red heat. The gaseous fuel is then passed to the hearth through one, and the air through the other, of the pair of heated regenerators the fuel and air being thus preheated in the regenerators. The air and fuel then unite in combustion over the hearth and effect the treatment of the metal and the gaseous products of combustion or exhaust gases are then led out from the opposite end of the hearth through another set of generators. The hot waste gases thus heat the renegerators and finally pass through the stack or chimney and into the air.

At frequent intervals, usually at definite times, the currents of fuel and air are reversed and caused to flow inwardly to the hearth through the regenerators which have been heated by waste gases during the preceding period and the exhaust gases are led out through the regenerators which have been cooled by the incoming fuel and air during the preceding period. These reversals are maintained at regular time intervals until the metal has been sufficiently treated and the furnace is ready to tap. By changing the course of the air and fuel at definite time intervals or according to the judgment of the operator a constant temperature may not be maintained and the regenerators may not become properly heated or the incoming fuel and air be too cool or too hot. It is especially undesirable to have the incoming fuel and air too cool.

One object of my invention is to overcome these difficulties by providing thermostats or other heat responsive devices in the regenerators so arranged that when a set or pair of regenerators reach a predetermined temperature the heat responsive device will cause the valves to be thrown and the incoming air and fuel to be directed through the pair of regenerators in which is the device which has so responded to the predetermined heat.

The heat responsive devices may be of any well known character and may be provided with indicating or recording mechanism or both; the valve operating means may be of any well known character and the valves themselves as well as the furnace and regenerators may be of any well known character.

In the accompanying drawings I have shown, diagrammatically, thermostats arranged in the regenerators so as to close electrical contacts when the predetermined condition is reached. The electrical contacts close a circuit through an electric motor which operates ordinary disk valves to change or reverse the course of the air and fuel and waste gases.

In the accompanying drawings I have shown one way in which my invention may be applied to an open hearth furnace.

Figure 2:
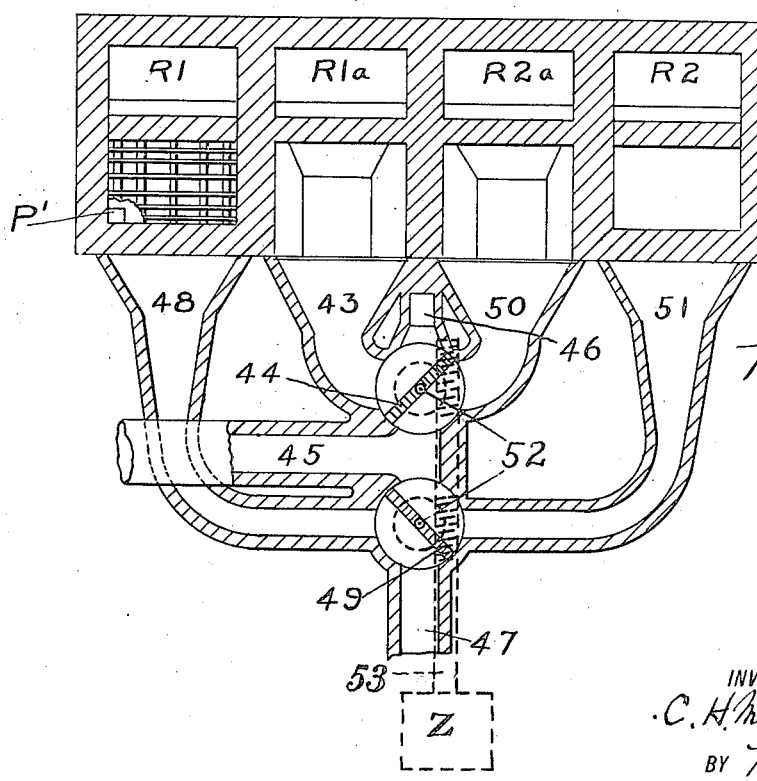

Figure 1 is a diagrammatic vertical section of such a furnace; Fig. 2 is a similar diagrammatic horizontal section of the furnace; Fig. 3 shows the connections between the motor and the valves and Fig. 4 is a diagrammatic showing of one way the valve operating electric motor may be controlled by the responsive device in the checker chambers.

The hearth 40 is connected through the channels 41 to the checker chambers $R^1$, $R^{1a}$ at one end and through the channels 42 to the checker chambers $R^2$, $R^{2a}$. From the air chamber $R^{1a}$ leads a channel 43 to the valve 44 and the valve will connect the channel 43 with either the stack 45 or with the air inlet 46. Likewise channels 48 lead from the gas chamber $R^1$ to the valve 49 which may connect the channel 48 with either the gas inlet 47 or the stack 45. Similarly channel 50 connects the air chamber $R^{2a}$ to the valve 44 and channel 51 connects the gas chamber $R^2$ to the valve 49 so that the chambers may be connected positively to the air and gas inlet or to the stack.

The valves 44 and 49 are so interconnected that when the chambers $R^1$ and $R^{1a}$ are connected to the stack the chambers $R^{2a}$ and $R^2$ will be connected respectively to the air and gas inlets and on reversal the chambers $R^{2a}$ and $R^2$ will be connected to the stack while chambers $R^{1a}$ and $R^1$ will be connected respectively to the air and gas inlets. The thermo-electric couples $P^1$ and $P^2$ are shown in the gas regenerators but obviously they might be in the air regenerators or elsewhere suitably located. The stems 52 of the valves 44 and 49 are both provided with gears shown in Fig. 3 and dotted in Fig. 2 engaging the worm shaft 53 so that both the valves may be turned together when the motor rotates the worm shaft 53.

The arrangement of this apparatus has been illustrated diagrammatically because in the details of it there is nothing new and the old type of apparatus may be used when assembled in the way I have indicated above. No especial or specific means for regulating or controlling the operation of the valves are essential to my invention but in order that it may be clearly understood I have illustrated one way in which electrical circuits may be arranged and associated with devices in the checker chambers responsive to the conditions of those chambers and adapted to control an electric motor to operate the valves in accordance with my invention associated with limits and safety devices, which, however, are not essential.

In Fig. 4 I have shown in detail one method of control. $R^1$ and $R^2$ diagrammatically represent regenerators. $P^1$ and $P^2$ are the thermo electric couples which in combination with milli-voltmeters $M^1$ and $M^2$ constitute a usual type of thermostat or pyrometer. $N^1$ and $N^2$ are the needles or pointers of the milli-voltmeters and $C^1$ and $C^2$ are strips of conducting material entirely insulated from the rest of the milli-voltmeters, except when the swing of the needles is such as to bring them in contact with these conducting strips; while $X^1$ and $X^2$ are terminals or brushes which connect $C^1$ and $C^2$ with outside conductors. B is a primary battery or other source of low voltage current. $Y^1$ and $Y^2$ are relays, each provided with five pairs of contact posts and three insulated conducting bridges. $G^1$, $G^2$ and $G^3$ are electric gongs, the first two being wound for the voltage of the power circuit hereafter described, while the third is wound for the voltage of battery B. $S^1$ and $S^2$ are push-button switches normally held open by springs. $L^1$ and $L^2$ are limit switches mechanically connected to the valves which reverse the air and gas supply, the connections being such that one limit switch will be opened by the arm 100 on the valve stem 52 as the valve reaches its end of travel in one direction, while the other switch will be opened by the arm 101 on the valve stem 52 when the valve approaches its limit of travel in the opposite direction. K is a knife switch, to the top clips of which are connected the mains of an electric power supply. $e^1$, $d^1$, $e^2$, $d^2$ and $h$ are magnetically operated contactors, of which $E^1$, $D^1$, $E^2$, $D^2$ and $H$ are the electromagnet windings. $r$ is a section of motor starting resistance; W is a relay designed to hold its contact open until a certain minimum current is reached; Q is an incandescent signal lamp; $a^1$ and $a^2$ are auxiliary contacts attached respectively to contactors $d^1$ and $d^2$. Z is a shunt wound reversing motor geared to the mechanism of the reversing valve having the field F and the armature A.

The pyrometer shown in the attached diagram is of the recording type in which the pointer traces a line upon a moving record but this is not essential. The conducting strips $C^1$ and $C^2$ may, if desired, consist of rings of a thin layer of metal mounted upon these records and insulated by the paper of the record from the frame of the instrument, it being understood that the inside edge of the ring will be reached by the pointer at the temperature at which it is desired to shift the valve. It is possible, however, to use an insulated adjustable metallic stop $C^3$ $C^4$ instead of the contact strips, and it is also posssible to use an indicating instrument instead of a recording instrument. Moreover, the pyrometer need not be one which is operated electrically, but may be actuated by heated gases or any other desired means.

The motor shown is of the direct current type, but the principle of this invention will apply equally well to an alternating current motor and control, or an air cylinder.

The method of operation is as follows:— Assuming that neither $N^1$ nor $N^2$ has yet come in contact with $C^1$ or $C^2$, and the relays $Y^1$ and $Y^2$ are not energized, as will be the case when the furnace is first started up, the operator will desire to throw the air and fuel valve in a certain direction. Assume that the operator closes $S^1$ and holds it closed for a short time. An electric circuit will then be established from the positive side of K through conductors 1 and 2, through $S^1$, conductor 3, $L^1$, conductor 4, coils $E^1$ and $D^1$, conductor 5 and back to the negative side of the switch. Contactors $e^1$ and $d^1$ will then close, establishing the circuit from positive through conductor 6, $e^1$, conductor 7, armature A, conductor 8, $d^1$, conductor 9 and 10, resistance $r$, conductor 11, relay W and conductor 12 to the negative side of switch K. A circuit will also be established branching from conductor 4 through 16, $G^1$ and 17 and through 12 to negative which will cause gong $G^1$ to ring while $S^1$ and $L^1$ remain closed. As soon as relay W, the plunger of which will be raised by the original rush of current, shall again fall and close its contact, another circuit will be established from the positive side of the line through conductor 1, $a^1$, conductors 14, relay contact, 15, H and conductor 5 to negative, thus causing $h$ to close, which will short circuit $r$ and cut it out of the motor circuit. In this manner the motor will be brought up to speed and will run in the given direction turning the valves until the valve reaches its end of travel, at which point limit switch $L^1$ will open, stopping the motor and also silencing gong $G^1$. It will be understood that the operator might, if he desired, have pushed switch $S^2$, in which case a similar set of connections would have been made, resulting in the closing of contactors $e^2$ and $d^2$, and consequently causing the motor to run in the opposite direction. It will also be understood that it will be necessary to use these push-button switches only in unusual cases in which the operator wishes to assume control of the apparatus. When the push-button $S^1$ has been used to determine the position of the reversing valve, the waste gases will be exhausted through regenerator $R^2$, the temperature of which will gradually rise, causing an electro-motive force to be present in the thermo-electric couple $P^2$ and a current to flow from the positive side of $P^2$ through conductor 18, through the coil of $M^2$ and through conductor 19, back to the negative side of $P^2$. The moving element of $M^2$ will then travel toward $C^2$; when it touches $C^2$, an electric circuit will be completed from the positive side of battery B through conductors 20 and 21, $N^2$, $C^2$, $X^2$, conductor 22, the actuating coil of $Y^2$ and conductors 23 and 24 back to the negative side of B. The plunger of relay $Y^2$ will then rise, causing its insulated bridges to engage with the contact posts immediately above them. This will establish a circuit from the positive side of K through conductors 1 and 25, the bottom bridge of $Y^2$, conductor 26, limit switch $L^2$, conductor 27, coils $E^2$ and $D^2$ and conductor 5 to the negative side of K, thus causing contactors $e^2$ and $d^2$ to close. A circuit will then be established from the positive side of K through conductor 6, $d^2$, conductor 8, armature A, conductor 7, $e^2$, conductors 9 and 10, resistance $r$, conductor 11, relay W and conductor 12, back to the negative side of K, thus causing current to flow through the motor armature in an opposite direction to that previously described. When the motor current has fallen to the proper value, relay W will close its contact and a circuit will be established from the positive side of K through conductor 1, auxiliary contact $a^2$, conductor 14, through the contact of relay W, conductor 15, coil H and conductor 5, back to the negative side of K. Contactor $h$ will then close, short-circuiting the resistance and bringing the motor up to full speed. The motor will then move the reversing valve until the latter has completed its travel, when limit switch $L^2$ will open, causing contactors $e^2$ and $d^2$ to open, thereby depriving the motor of power. Until the limit switch $L^2$ has opened, gong $G^2$ will receive positive current from conductor 27 through conductor 28, through $G^2$ and conductor 12 to th negative side of K. When the plunger of relay $Y^2$ rises there will also be established a circuit from the positive side of battery B through conductors 20, 21 and 30, through the upper bridge of relay $Y^1$ (the plunger of which has remained in the bottom position), through conductor 29, the top bridge of relay $Y^2$, through the winding of $Y^2$ and through conductors 23 and 24 to the negative side of B. The winding of $Y^2$ will thus receive current independent of any contact made by $N^2$, which may recede from $C^2$ as the temperature of $R^2$ drops, without having to break any current and without affecting the position of the plunger of $Y^2$.

The exhaust gases having now been thrown into regenerator $R^1$, the needle $N^1$ of milli-voltmeter $M^1$ will approach $C^1$, which it will make contact with when the regenerator attains the proper temperature. A circuit will then be established from the positive side of B through conductors 20 and 21, $N^1$, $C^1$, $X^1$, 31, the winding of $Y^1$ and conductors 23 and 24 back to the negative side of B, thus causing the plunger of $Y^1$ to rise, consequently opening the circuit between 29 and 30, which will deënergize $Y^2$, so that its plunger will fall. It will also establish the following circuit: from the positive side of K through conductors 1 and 25, through the bottom bridge of $Y^1$ to conductor 3. A similar set of connections will then have been established to those described when push-button $S^1$ was closed, so that motor armature A will receive positive current through conductor 7 and the reversing valve will be brought back to its former position. The cycle may thus be continued indefinitely, the reversing valve being moved each time that one of the regenerators attains the maximum desirable temperature. It will also be noted that gongs $G^1$ and $G^2$ will ring alternately during the movements of the reversing valve, thus giving an indication to the attendant of what is happening. If by reason of some accident, both the relay plungers should be in the "up" position at the same time, a circuit will be established from the positive side of the batter B through conductors 20 and 21, through the middle bridge of the relay $Y^2$, through conductor 33, gong $G^3$, conductor 34, the middle bridge of relay $Y^1$ and conductor 24 to the negative side of the battery, thus warning the attendant of trouble. In case both relay plungers should be in the "down" position at the same time, which is a condition not prevailing ordinarily, a circuit will be established from the positive side of K through conductors 1 and 25, the bottom bridge of relay $Y^1$, conductor 36, incandescent lamp Q, conductor 35, the bottom bridge of relay $Y^2$ and conductor 12 to the negative side of K, thus warning the operator by the lighting of Q that one of the relays has failed to act. If desired, the contacts $C^3$ and $C^4$ may be added to instruments $M^1$ and $M^2$. These contacts will be connected respectively with $X^1$ and $X^2$; they will project over the contact strips $C^1$ and $C^2$ to a position just outside the inner edges of the latter. Thus, if pointers $N^1$ and $N^2$ should for any reason fail to make proper contact with contact strips $C^1$ and $C^2$, they would shortly engage with the projecting contacts $C^3$ and $C^4$ and would produce the correct results.

I claim as my invention:

1. In combination, a hearth, a pair of checker chambers, means for causing air and fuel to pass through the chambers to the hearth, a stack, a second pair of checker chambers, and means for causing the fumes from the hearth to pass through the second chambers to the stack, a thermostat in the second pair of checker chambers, and means controlled by the thermostat for causing the fuel and air to pass through the second checker chambers to the hearth and the fumes from the hearth to pass through the first checker chambers to the stack.

2. In combination, a hearth, checker chambers at each end of the hearth, air and gas inlets leading to the checker chambers, a stack, outlets from the checker chambers to the stack, valves between the air and fuel inlets and checker chambers, valves between the checker chambers and the stack, thermostats in the checker chambers, and means controlled by the thermostats for operating the valves.

3. In combination a plurality of regenerators, a device for using the effluent from the regenerators, a device in the regenerators responding to the condition of a regenerator, and a device controlled by the last named device for reversing the flow through the regenerators.

4. In combination, a plurality of regenerators, a device for causing a passage of fluid through the regenerators, a device in the regenerators responding to the condition of a regenerator, a device controlled by the last named device for reversing the flow through the regenerators.

5. In combination, a hearth, a pair of checker chambers, means for causing air and fuel to pass through the chambers to the hearth, a stack, a second pair of checker chambers, and means for causing the fumes from the hearth to pass through the second chambers to the stack, a thermostat in the second pair of checker chambers, and means controlled by the thermostat for reversing the path of the fluids.

6. In combination, a hearth, a pair of checker chambers, means for causing air and fuel to pass through the chambers to the hearth, a stack, a second pair of checker chambers, and means for causing the fumes from the hearth to pass through the second chambers to the stack, and automatic means for causing the fuel and air to pass through the second checker chambers to the hearth and the fumes from the hearth to pass through the first checker chambers to the stack.

7. In combination, a hearth, checker chambers, means for causing a fluid to pass through the chambers to the hearth, a stack, other checker chambers, and means for causing effluent from the hearth to pass through the second chambers to the stack, a device in the second checker chambers and responsive to the condition of the chamber, and means controlled by the device for reversing the flow.

8. In combination, a hearth, checker chambers at each end of the hearth, air and gas inlets leading to the checker chambers, a stack, outlets from the checker chambers to the stack, valves controlling the inlets and outlets, devices in the checker chambers and responsive to the condition of a chamber, and means controlled by the devices for operating the valves.

Signed at Limerick this 10th day of April, 1915.

CHARLES H. MACMILLAN.

Witnesses:
GLENN C. LIBBY,
ROBERT W. LIBBEY.